May 6, 1941.   R. W. FAULHABER   2,241,250
SADDLE CONSTRUCTION
Original Filed Oct. 4, 1937

INVENTOR.
ROLAND W. FAULHABER.
BY
ATTORNEYS

Patented May 6, 1941

2,241,250

UNITED STATES PATENT OFFICE 2,241,250

SADDLE CONSTRUCTION

Roland W. Faulhaber, Monroeville, Ohio, assignor to The Faulhaber Company, Monroeville, Ohio, a corporation of Ohio Application October 4, 1937, Serial No. 167,129
Renewed May 23, 1940

2 Claims. (Cl. 155—5.23)

This invention relates to saddle construction and more particularly to a bicycle or tricycle saddle and the method of upholstering or covering the same.

It is among the objects of my invention to provide a bicycle saddle which will be simple and durable in construction and which will provide a comfortable and attractive support for the user of the vehicle. It is a further object of my invention to provide a saddle construction in which a sheet metal saddle base, a saddle cushion and saddle covering member are secured to each other in their desired assembled relation in a novel manner effecting marked economies in assembly cost. It is a further and more specific object of my invention to provide a saddle construction in which a saddle covering is wrapped about a rigid saddle base and secured thereto by a resilient holding device at the underside of the base. Further objects and advantages relating to simplicity of construction and economy of manufacture will appear from the following description and the appended drawing in which:

Figure 1:
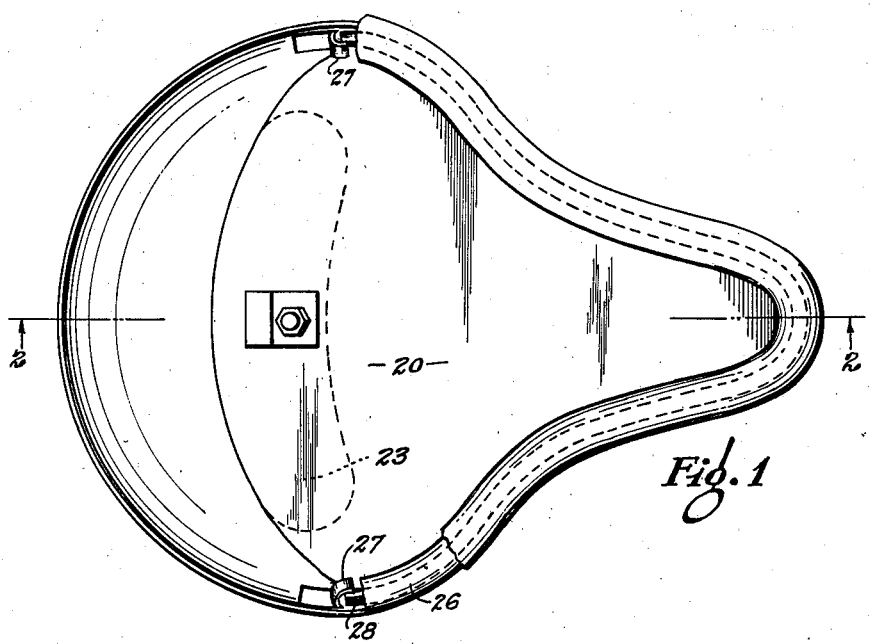
Figure 1 is a plan view showing the underside of a saddle constructed according to my invention.
Figure 2:
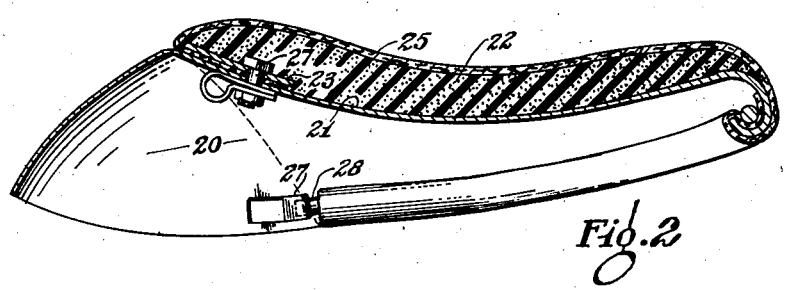
Figure 2 is a sectional view taken along the line 2—2 of Figure 1.

Referring to the drawing, the saddle construction per se as distinguished from any spring supporting structure therefor preferably comprises a sheet metal base portion 20 stamped and drawn from sheet metal to substantially the finished shape of the saddle. During the shaping of the sheet metal base portion 20 at least a part of the lower peripheral edge is curved inwardly and upwardly to provide an inturned lip or flange 26 which functions to re-enforce the entire base portion structure and also functions to co-operate with a saddle covering means.

In the illustrated embodiments the rear portion of the sheet metal base is intended to be exposed and only the cushioning device and forward part of the saddle is covered with leather or the like. The sheet metal base 20 is depressed as at 21 to receive a cushion member 22. To secure the covering 25 to the rear portion of the cushion 22, the cover is wrapped about the edge of the cushion and disposed between the cushion and the base 20. A curved metal plate 23 is preferably disposed between the underside of the cushion 22 and the inturned edge of the cover 25. Fastening means 27 carried by the metal plate may extend through the inturned edge of the cover and through suitable apertures provided in the sheet metal base portion 20.

The balance of the covering material may thereafter be wrapped about the lower peripheral edge of the base 20 and tucked within the peripheral flange 26. The flange 26 is proportioned to receive both the edge of the covering material and a spring wire retaining device 28, which presses outwardly substantially throughout its length to clamp the edge of the covering material against the inner surface of the base 20 and hold the covering material in position. In this form of my invention the retaining device is preferably provided with a generally V-shape and the free ends of the spring wire 28 may be retained in the position shown within the inturned flange by suitble lugs 29 struck out of the sheet metal of the base portion 20.

Although I have described and shown an embodiment of my invention in considerable detail, it will be understood by those skilled in the art that numerous variations and modifications may be made therein without departing from the scope of the invention as defined by the following claims.

I claim:

1. A saddle construction comprising a sheet metal base portion shaped to provide a relatively narrow forward saddle part and a rearwardly diverging rear saddle part, a flexible covering for said base portion proportioned to cover said narrow forward part and a part of said rear saddle portion, the rear edge of said covering member secured to the top of the base and the remainder of said covering member arranged to encompass the side walls of the base, means to secure the edges of said remainder to the base comprising an inwardly turned flange along the lower edge of the base to receive the edges of the covering member and a resilient member fitted within said flange and secured to the base in a manner to bind the edges of the covering member within the flange.

2. A saddle construction comprising a sheet metal base portion shaped to provide a relatively narrow channel shaped forward saddle part and a rearwardly diverging rear saddle part, a pad upon the upper surface of said base, a flexible covering for said base covering said pad and the side walls of said channel shaped forward saddle portion, means securing the rear edge of said covering member to the base, the side edges of said covering member being turned around the edges of said channel shaped forward saddle part and into the channel, and a resilient member within the channel shaped to conform to the contour of said forward saddle part and having its ends secured to opposite sides of the base at substantially the widest part of the base, said member engaging and frictionally retaining the side edges of said covering within the base.

ROLAND W. FAULHABER.